United States Patent [19]
Jones

[11] Patent Number: 5,176,855
[45] Date of Patent: Jan. 5, 1993

[54] LIQUID FUEL SYSTEM WITH TILT VALVE

[75] Inventor: James S. Jones, Richardson, Tex.

[73] Assignee: David P. Ward, Dallas, Tex.

[21] Appl. No.: 664,985

[22] Filed: Mar. 5, 1991

Related U.S. Application Data

[63] Continuation-in-part of Ser. No. 474,487, Feb. 2, 1990, Pat. No. 4,997,458.

[51] Int. Cl.⁵ .................... F02M 1/10; F02M 7/22
[52] U.S. Cl. .................... 261/39.3; 261/50.2; 261/69.1; 261/DIG. 78
[58] Field of Search ............ 261/39.3, 69.1, 50.2, 261/DIG. 78

[56] References Cited

U.S. PATENT DOCUMENTS

| | | |
|---|---|---|
| 562,410 | 6/1896 | Moon . |
| 913,121 | 2/1909 | Frayer . |
| 2,068,804 | 1/1937 | Kedzie . |
| 2,160,067 | 5/1939 | Gistucci et al. ............ 261/69.1 |
| 2,499,554 | 3/1950 | Wirth .................... 261/50.2 |
| 2,763,538 | 9/1956 | Pilling et al. . |
| 2,919,885 | 11/1958 | Daigle . |
| 2,957,759 | 1/1957 | Jettinghoff . |
| 3,367,637 | 2/1968 | Hazzard ................ 261/50.2 |
| 3,623,696 | 11/1971 | Baumann . |
| 3,754,739 | 8/1973 | Buike et al. ............ 261/50.2 |
| 4,026,259 | 5/1977 | Meyerdierks et al. .... 261/50.2 |
| 4,089,308 | 5/1978 | Pierlot ................ 261/50.2 |
| 4,193,578 | 3/1980 | Brumm . |
| 4,285,700 | 8/1981 | Fox . |
| 4,894,067 | 1/1990 | Bayerstock . |

OTHER PUBLICATIONS

OGH X-100 Series Carburetor by Nolff's Carburetion, Inc. (no date).

Primary Examiner—Tim Miles
Attorney, Agent, or Firm—Daniel V. Thompson

[57] ABSTRACT

An improved carburetor uses a butterfly air valve having a controlled air pressure difference across it and positions a tilt valve, proportionally to feed the liquid fuel with a predetermined pressure difference across the fuel valve and the metered fuel is picked up by air and fed into the main air stream below the throttle place through a small air passage.

6 Claims, 1 Drawing Sheet

LIQUID FUEL SYSTEM WITH TILT VALVE

CROSS REFERENCE TO RELATED APPLICATION

This is a continuation-in-part of U.S. patent application Ser. No. 07/474,487, filed Feb. 2, 1990, now U.S. Pat. No. 4,997,458, issued Mar. 5, 1991.

FIELD OF THE INVENTION

This invention relates to air/fuel systems for internal combustion engines, and more specifically to systems where the fuel is liquid at normal ambient conditions and is metered over the entire operating range at a predetermined fuel pressure difference.

BACKGROUND ART

Mechanical fuel systems, gasoline carburetors, charge forming devices—systems that read air flows with venturies to control the pressure difference across fixed fuel orifices—are constantly plagued by the viscosity flow factors of gasoline at low temperatures and light pressure differences. Gasoline at $-20°$ F. has a viscosity of 4.6, a viscosity of 3.4 at $+20°$ F., and a viscosity of 1.2 at $100°$ F. Comparing the flow factors at pressure differences of 0.1 PSI and 6.0 PSI: $-20°$ F. yields 0.228 and 0.865, respectively; $+20°$ F. yields 0.300 and 0.900; and $100°$ F. yields 0.900 and 0.995. 0.1 PSI is the equivalent of 2.8 ins. H$_2$O, and 2.8 ins. pressure difference across a venturi has an air velocity of 100 feet per second or 75 miles per hour, which is about 17% of max air. Comparing these metering pressure differences with those used with the ported injection systems of about 25 PSI, the factors become 0.945 at $-20°$ F, 0.96 at $+20°$ F. and 1.00 at $100°$ F. These figures pretty well describe the difficulty of metering with a simple carburetor.

SUMMARY OF THE INVENTION

This invention uses a preset constant fuel pressure to a fuel valve that sets up the air/fuel base and by using the force of a bimetal strip that controls the air pressure difference across the air valve butterfly, and which also positions the fuel metering valve (tilt valve), the relation of pressure differences between the air and fuel is altered for temperature compensation. The greater the temperature the greater the pressure difference across the air leg. The metered fuel is fed into an air stream that moves air from a point upstream of the air valve to a point below the throttle valve.

DETAILED DESCRIPTION OF THE DRAWINGS

Figure 1:
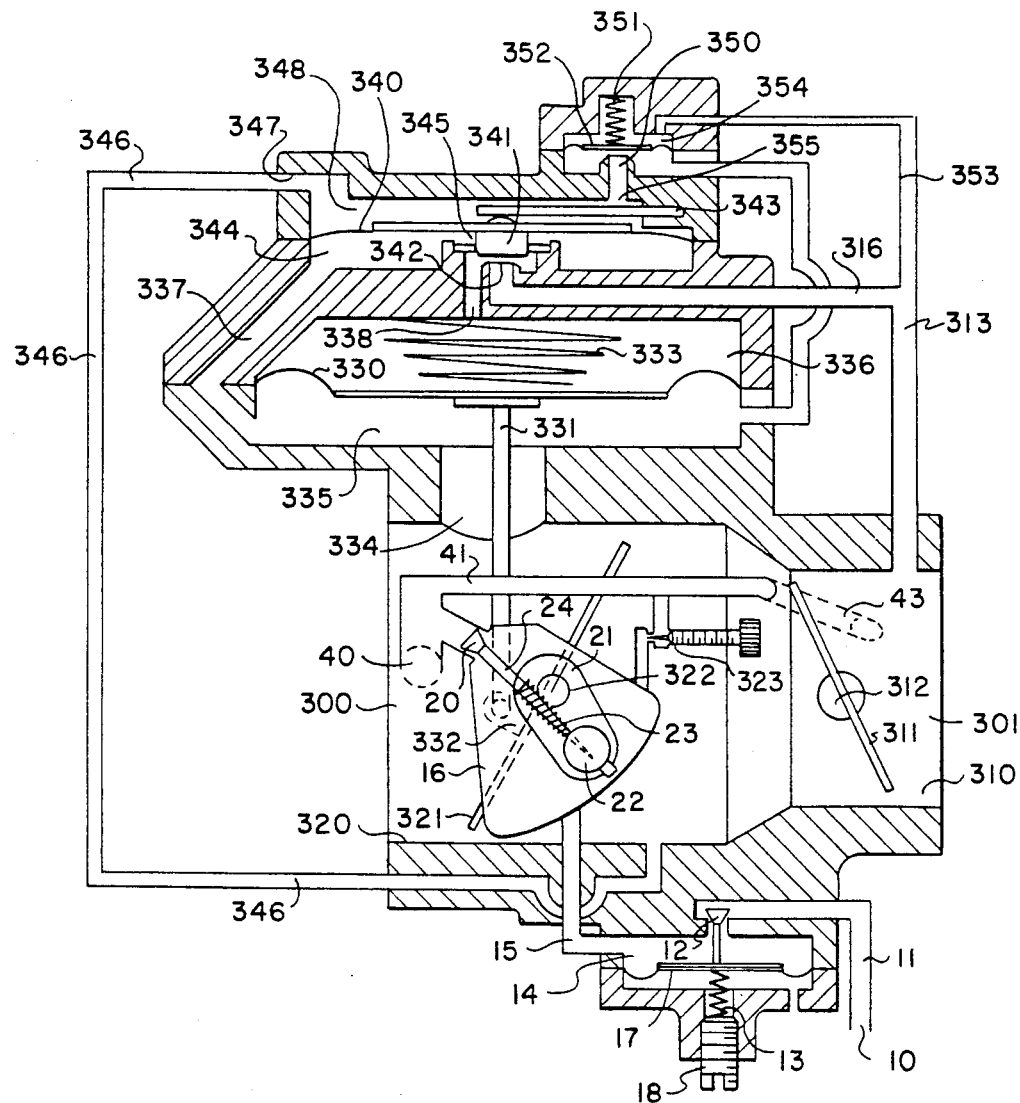
FIG. 1 is a line partially broken away schematic side view of system constructed in accordance with the invention.

Referring initially to FIG. 1, the system includes a fuel inlet 10 that feeds through passage 11 to throttling valve 12, with liquid fuel at the engine's fuel pump pressure, and with the force of metering spring 13 acting to open valve 12. The fuel across valve 12 enters chamber 14 and flows through passage 15 into chamber 16, where it meets with resistance at tilt valve 20. The resistance to flow at tilt valve 20 causes a pressure rise in chamber 14 which acts on diaphragm 17, applying a force on spring 13 bringing about a balance of forces to maintain the proper pressure in chamber 14. Trim screw 18 is adjusted to set up the fuel pressure in chamber 14. This trim is the total system trim and compensates for the small manufacturing errors—tilt valve position, the bimetal strip position, etc., as well as the trim for the operating altitude.

The air side of the system has a main air flow inlet 300 with the outlet 301. Outlet 301 has a bore 310 in which throttle butterfly 311 mounted on throttle shaft 312, which is rotated to position butterfly 311 to control the air flow to the engine. Air inlet 300 has a bore 320 that has the air valve butterfly 321 mounted on shaft 322 and is positioned by air valve diaphragm 330 which acts through pin 331 and clevis 332, which is mounted on air valve butterfly 321. Air valve butterfly 321 is normally closed by spring 333 and its position is controlled by control diaphragm 340. Diaphragm 340 has a valve piece 341 extending through its center with means on one end to throttle vacuum valve 342 with means on its opposite end to receive force from the bimetal strip 343. The air valve diaphragm 330 has communication from inlet 300 through opening 334 into chamber 335 and into chamber 336 by way of passages 337 and chamber 344 and across restriction 345 formed by the skirt of valve piece 341 and its guide and o through passage 338.

In operation, when the engine is at rest air valve 321 and tilt valve 20 are closed by spring 333, the idle trim 323 is open to a fixed value of fuel, the vacuum valve 342 is closed by the force of the bimetal strip 343. The part throttle valve 350 is closed by spring 351. As the engine is cranking the resistance to air across the air valve 321 is read through passages 346 across part throttle vacuum orifice 347 and into chamber 348. The vacuum created by the air valve acts across the control diaphragm 340 overcoming the force of the bimetal strip 343 to open the vacuum valve 342 moving air across resistance 345 to outlet 301 by way of vacuum passages 313 forming a vacuum in chamber 336 that overcomes the force of spring 333, thereby positioning air valve 321 to maintain the pressure difference across it that is allowed by the bimetal strip 343. Manifold vacuum acts on diaphragm 352 in chamber 354 through passages 313 and 353, and at engine loads of about 85% and less the force of spring 351 is overcome, opening valve 350 allowing the movement of free air from chamber 335 to a position downstream of the air valve across free air orifice 355 into chamber 348 across vacuum orifice 347 through passages 346. The free air orifice 355 and the vacuum orifice 347 are so proportioned to provide the proper percent cf the air valve vacuum acting in chamber 348 to balance the force applied by the bimetal strip and requires a closing of the air valve to increase the vacuum across air valve 321 which in turn closes the tilt valve 20 reducing the fuel flow.

Figure 2:
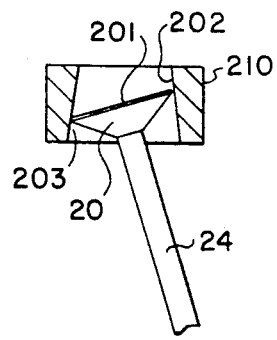
FIG. 2 is an enlarged partially broken away side view of the tilt valve and cone.

There is a fixed lever 21 attached to the air valve shaft 322 that carries a swivel 22 having a through hole that the tilt valve shaft 24 slides through. The tilt valve 20, FIG. 2, has a disc type hardened valve 201, that tilts in a cone 210 when the air valve is opened and forms open areas 202 and 203 that is very much like the open areas formed by the butterfly; these open areas are virtually linear even though the tilt valve is opened less than half the degrees of the butterfly. Spring 23 holds the tilt valve into the cone. The liquid fuel metered by the tilt valve varies only with the open areas across the tilt valve and the V factor which relates to the viscosity and the fuel pressure difference across the valve. Should the engine's fuel pump have the capability of providing 15 PSIG, the system could be set up to trim for operating altitudes from sea level at a pressure of 13 PSIG and a V factor of 0.86 at −40° F. to 20,000 feet with a pressure of 6.00 PSIG and a V factor of 0.80 at −40° F. The pressure trim 18, FIG. 1, trims for the normal little variables of manufacturing and to trim for the operating altitude. The throttle butterfly 311 controls the quantity of air to the engine. The air valve butterfly 321 must be positioned to accommodate that air quantity, but the pressure difference will be determined by the bimetal strip 343 which will compensate for temperature, with the lower the temperature the lower the pressure difference across the air valve. Greater opening is required to accommodate the air quantity. The fuel valve follows the air valve and is also opened. Since the pressure difference across the fuel valve is constant the fuel flow is increased to compensate for the greater density of the colder air and the loss of the fuel flow due to its viscosity.

The pressure difference across the air valve (vacuum) varies from 4.8 ins. H$_2$O at −40° F. to 13.3 ins. H$_2$O at 200° F., and has a pressure difference of 9.12 ins. at 100° F. There is a passage communicating from the inlet 300 to the outlet 301. This passage has a rather large intake 40 and receives the metered fuel. Soon after the meeting of the fuel and air the passage is reduced at 41. The discharge of this passage 43 enters outlet bore 310 in an area that is always below the throttle plate 311. The minimum pressure difference across this passage is with the throttle 311 full open at cranking at the temperature corrected pressure −40° F.=4.5 ins. H$_2$O. This relates to an air velocity of 127 feet per second or 86 miles per hour. The fuel exposed to these velocities will be well broken up as they leave the discharge 43. The air velocity through this passage will be sonic. Even at engine loads of 80%, the velocity will be 433 feet per second or 295 miles per hour, and even at 1" HG the velocity would be 210 feet per second or 146 miles per hour. With this arrangement the fuel leaving the discharge 43 will be in its gas phase, well blended, as it meets the main air stream and even at max power the fuel considered liquid as it enters the main air stream will be very small droplets.

The temperature compensation device has a total max movement of 0.007" with a normal operating movement of 0.003" and less and is virtually frictionless and the pressure error across the air valve 321 is the error of the compensating device.

The required compensation can be expressed as the fuel factor (V) divided by the air factor ($\sqrt{\text{density}}$) squared—this relates directly to the compensating vacuum allowed by the bimetal strip. This device will provide a fuel system for internal combustion engines that has a tight control of air/fuel over a broad temperature range with means to manually adjust to altitude base.

I claim:

1. A liquid fuel system for an internal combustion engine, comprising:
    a body having a bore with an air inlet and outlet;
    the body having a connection to a source of liquid fuel; and
    a tilt valve constructed and arranged within the body to meter the flow of liquid fuel into the bore in response to air flow in the bore, the tilt valve having a valve body with a circular edge, the valve body constructed and arranged for tilting movements within a frustroconical sealing surface.

2. The system of claim 1 wherein the body includes means for regulating the pressure of the fuel upstream of the tilt valve.

3. The system of claim 1 with an air valve in the bore constructed and arranged to control the position of the tilt valve.

4. The system of claim 3 including a bimetal strip constructed and arranged to control air pressure difference across the air valve to compensate for temperature.

5. The system of claim 3 with the air valve upstream of a user-controlled throttle valve.

6. A liquid fuel system for an internal combustion engine, comprising:
    a body having a bore with an air inlet and outlet;
    the body having a connection to a source of liquid fuel;
    a tilt valve constructed and arranged within the body to meter the flow of liquid fuel into the bore in response to air flow in the bore, the tilt valve having a valve body with a circular edge, the valve body constructed and arranged for tilting movements within a frustroconical sealing surface;
    means for regulating the pressure of the fuel upstream of the tilt valve;
    an air valve in the bore constructed and arranged to control the position of the tilt valve;
    a bimetal strip constructed and arranged to control air pressure difference across the air valve to compensate for temperature; and
    the air valve upstream of a user-controlled throttle valve.

* * * * *